United States Patent [19]
Henriques

[11] Patent Number: 5,347,747
[45] Date of Patent: Sep. 20, 1994

[54] ANIMAL TRAP

[76] Inventor: Joseph Henriques, 17 Cove Rd., Brookfield, Conn. 06804

[21] Appl. No.: 59,709

[22] Filed: May 10, 1993

[51] Int. Cl.⁵ ............................................. A01K 69/06
[52] U.S. Cl. ............................................ 43/66; 43/61
[58] Field of Search ..................... 43/64, 65, 66, 60, 61

[56] References Cited

U.S. PATENT DOCUMENTS

| | | |
|---|---|---|
| 72,396 | 12/1867 | Huntington . |
| 119,435 | 9/1871 | Webb ........................................ 43/65 |
| 211,094 | 1/1879 | Henry ....................................... 43/61 |
| 224,960 | 2/1880 | Simpson .................................... 43/66 |
| 371,693 | 10/1887 | McKay . |
| 472,687 | 4/1892 | Winkler .................................... 43/61 |
| 538,118 | 4/1895 | Olivos ....................................... 43/66 |
| 721,531 | 2/1903 | Alston . |
| 818,357 | 4/1906 | Davis . |
| 934,469 | 9/1909 | Shoup ....................................... 43/66 |
| 1,142,781 | 6/1915 | Cameron . |
| 1,190,859 | 7/1916 | Causey . |
| 1,479,509 | 1/1924 | Meyer . |
| 1,501,378 | 7/1924 | Talisman . |
| 1,515,559 | 11/1924 | Edwards . |
| 1,684,484 | 9/1928 | Gilkey ...................................... 43/61 |
| 1,726,493 | 4/1929 | Kelley . |
| 1,911,919 | 3/1932 | Molls . |
| 2,273,008 | 2/1942 | Fisher . |
| 2,787,082 | 9/1954 | Paschen . |
| 4,744,170 | 5/1988 | Chow ....................................... 43/61 |
| 4,782,620 | 11/1988 | Syszczyk ................................... 43/66 |
| 4,879,836 | 11/1989 | Dolyny . |
| 4,887,381 | 12/1989 | Tieben . |

FOREIGN PATENT DOCUMENTS 2601229  1/1988  France ...................... 43/60

Primary Examiner—P. Austin Bradley
Assistant Examiner—James Miner
Attorney, Agent, or Firm—Ware, Fressola, Van Der Sluys & Adolphson

[57] ABSTRACT

An improved animal trap 10 includes a housing 12 with a hinged lid 14 that may be locked in a closed position by way of a latch 18 and a pin 20. When the lid 14 is closed, a non-linear passageway is formed within the trap 10 with two rectangular cross-sectional passageways 22, 24 that are secured at a right angle to each other. External access to the non-linear passageway is made through an opening 26 in a wall of the housing 12. Each of the two passageways 22, 24 maintains a door 36, 38, respectively, that opens only inwardly with respect to the interior of the housing 12. The doors 36, 38 are substantially prevented from being opened from the inside of the housing 12 by way of the non-linear characteristic of the passageway and a corresponding pair of slotted pivot regions 32, 34, respectively. Animals are attracted to the trap 10 with bait that is confined within a protruding cylinder 42 having a mating cap 44. A plurality of holes 46, 48 are formed in the mating cap 44 and in the wall of the housing 12, respectively, so as to allow the aroma of the bait to emanate external to and within the housing 12.

17 Claims, 3 Drawing Sheets

ANIMAL TRAP

BACKGROUND OF THE INVENTION

1. Field of the Invention

The present invention relates to animal traps and, more particularly, to an improved animal trap that is simple and inexpensive to manufacture and that requires only minimal maintenance.

2. Description of the Prior Art

Traps for the capture and confinement of animals have been used for many years. Consequently, there have been many animal trap designs and/or refinements thereof produced over the years. For example, U.S. Pat. Nos. 4,887,381, 2,787,082, 1,911,919, 1,726,493, and 371,693 all disclose various animal trap designs. To familiarize the reader with some of the relevant prior art, a brief description of these prior art designs is now given.

In U.S. Pat. No. 4,887,381, Tieben discloses an animal trap that includes a housing with an entry port and a pair of animal-actuated, gravity-lowered doors that are successively mounted within the entry port such that each door opens inwardly only. The pair of successively mounted doors are coupled to each other to substantially prevent the innermost door from opening when the outermost door is in a closed position, thereby preventing an animal confined within the housing from escaping.

In U.S. Pat. No. 2,787,082, Paschen discloses a rat trap that includes a container with an open end where a one-way gate is located which is adapted to be pushed aside by an entering rodent and then returned to its original position so as to prevent egress of the rodent from the container. The gate includes a flexible wire mesh curtain and a several independently movable stiffening rods upon which the curtain lays. When the rodent enters the container the curtain forms to the contour of the rodent so as to prevent the escape of any previously captured rodents.

In U.S. Pat. No. 1,911,919, Molls discloses a trap that may be collapsed into a small compass for transportation and storage purposes. When the trap is deployed in its operable fashion it consists of a rectangular housing with at least one open end having a pair of animal-actuated, gravity-lowered doors that open inwardly only. One of the doors maintains a plurality of fines so as to prevent an animal from backing out of the housing.

In U.S. Pat. No. 1,726,493, Kelley discloses an animal trap that employs a depressible platform to control the movement of certain doors in a trap housing. When an animal is drawn onto the platform with bait, the platform effects the closure of a door in a manner such that the door may only be reopened when the animal advances further into the trap housing through a series of interacting doors which prevent the animal from escaping.

In U.S. Pat. No. 371,693, McKay discloses an animal trap that includes a rectangular housing with an open end. At the closed end of the housing bait is displayed on a lever that is connected to a plate by a rod. The plate holds a pair of inwardly opening doors in an open position until an animal enters the trap and moves the lever when trying to remove the bait. When the lever is moved, the plate releases the doors such that they are closed, thereby preventing the animal from escaping.

Although all of the above-mentioned prior art traps provide certain means of capturing animals by employing a series of inwardly opening doors within a housing, none provide for the capture of animals by employing a series of inwardly opening doors in a non-co-linear manner within a housing so as to greatly limit the egress of a captured animal. Furthermore, none of the above-mentioned prior art traps combine this non-co-linear door placement concept in an easily constructed and maintained trap housing along with doors that are substantially prevented from being opened by the captured animal through the use of a unique slotted pivot region concept. It would therefore be desirable to overcome the shortcomings of the above-mentioned prior art traps in these areas, while providing an inexpensive and easily constructed and maintained animal trap.

SUMMARY OF THE INVENTION

The present invention contemplates an animal trap that employs a series of inwardly opening, gravity-lowered doors in a non-co-linear fashion in a housing that can be easily and inexpensively constructed with plastic or a similarly rugged material that can be easily cleaned and maintained. The doors open inwardly by way of a slotted pivot region so as to allow an animal to enter the housing in pursuit of physically confined bait. Once the animal is captured within the housing, the slotted pivot region acts to substantially prevent the animal from opening the doors, thereby preventing the animal from escaping. The non-co-linear door placement concept greatly limits the egress of the captured animal by creating a constricted area so that the animal may not even attempt to open the doors.

In addition, the trap includes a protruding cylinder and a mating cap for the storage of bait. The cylinder is attached to the exterior of the trap wall. Via holes in the adjoining portion of the trap wall as well as holes in a cap that can be screwed onto the cylinder, the bait aroma is allowed to spread throughout both the interior and the adjacent exterior of the trap. The holes are sufficiently small as to prevent the bait from being reached by the animal. This arrangement facilitates placement of bait within the interior of the cylinder while minimizing debris within the trap.

From the above descriptive summary, it is apparent how the present invention animal trap overcomes the shortcomings of the above-mentioned prior art traps.

Accordingly, the primary objective of the present invention is to provide an animal trap that employs a series of unique inwardly opening, gravity-lowered doors in a non-co-linear manner in a housing that can be easily and inexpensively constructed with plastic or a similarly rugged material that can be easily cleaned and maintained.

Other objectives and advantages of the present invention will become apparent to those skilled in the art upon reading the following detailed description and claims, in conjunction with the accompanying drawings which are appended hereto.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

PREFERRED EMBODIMENT OF THE PRESENT INVENTION

Figure 1:
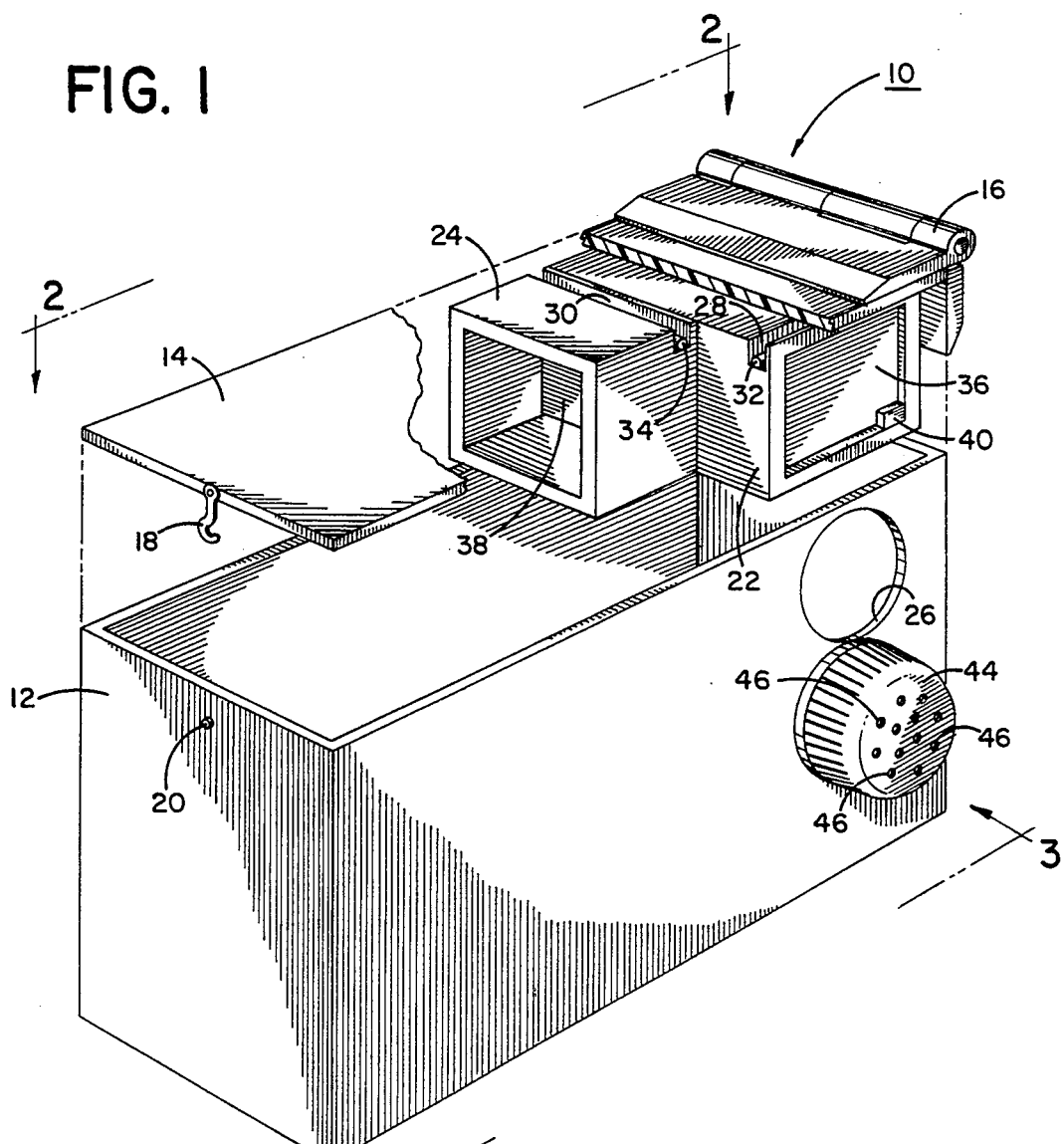
FIG. 1 is a three dimensional, partial cross-sectional, and partially exploded assembly view of an improved animal trap according to the present invention.
Figure 3:
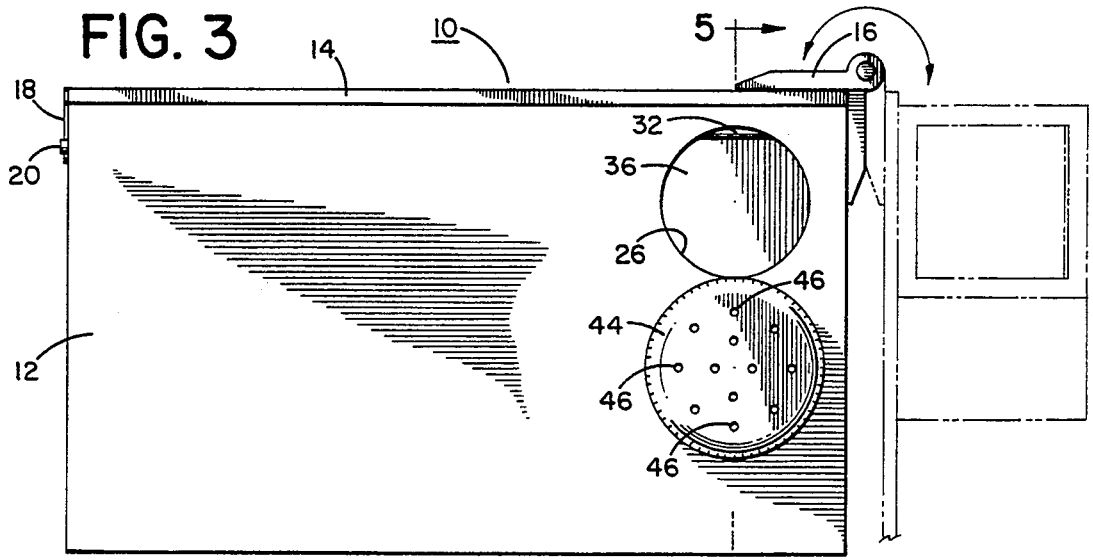
FIG. 3 is a side view of the present invention improved animal trap of FIG. 1 with the lid shown in its operative positions, taken along line 3—3 of FIG. 1.

Referring to FIG. 1, there is shown an assembly 10 of an improved animal trap that includes a five-sided housing 12 and a housing lid 14 operatively joined by way of a hinge 16. The hinge 16 allows the lid 14 to be pivotally positioned in either an open or a closed position with respect to the top of the housing 12 (see FIG. 3). When the lid 14 is in the closed position, the inside of the housing 12 may not be accessed through the top of the housing 12. The lid 14 may be locked in this closed position by way of a latch 18 and a pin 20 arrangement.

Figure 4:
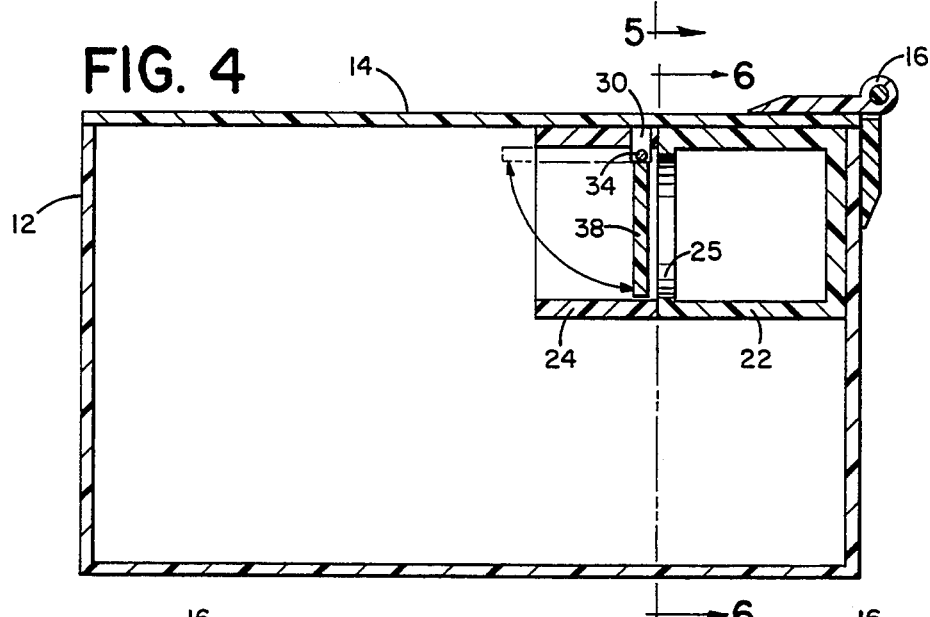
FIG. 4 is a cross-sectional view of the present invention improved animal trap of FIG. 1 with the interior door shown in its operative positions, taken along line 4—4 of FIG. 2.

Secured to the bottom of the lid 14 are two passageways 22 and 24 having rectangular cross-sections. The two passageways 22 and 24 are also secured to each other at a right angle, and a circular opening 25 (see FIGS. 4 and 6) is formed in a side wall of passageway 22 such that a single non-linear passageway is formed when the lid 14 is in the closed position. A circular opening 26 in one of the side walls of the housing 12 provides access to the interior of the housing 12 through this non-linear passageway. The two passageways 22 and 24 provide slotted pivot regions 28 and 30, respectively, which are formed in the walls of the passageways 22 and 24 that are secured to the lid 14. Within the slotted pivot regions 28 and 30 are pivot rods 32 and 34 that are secured to doors 36 and 38, respectively. Since the slotted pivot regions 28 and 30 are formed in the walls of the passageways 22 and 24 that are secured to the lid 14, the pivot rods 32 and 34 are confined in the slotted pivot regions 28 and 30 so as to provide hinge arrangements for the doors 36 and 38, respectively. The slotted pivot region 28,30 and pivot rod 32,34 hinge arrangements allow the doors 36 and 38 to open inwardly with respect to the interior of the housing 12 when an inward force is applied to the doors 36 and 38 (see FIGS. 4 and 5). The circular shape of the openings 25 and 26 prevent the doors 38 and 36, respectively, from opening outwardly with respect to the interior of the housing 12 when the lid 14 is in the closed position. A door stop 40 is provided in passageway 22 to prevent door 36 from opening outwardly when the lid 14 is in the open position, thereby preventing door 36 from being lodged between the lid 14 and the housing 12 when the lid 14 is transitioned into the closed position. Gravity maintains both doors 36 and 38 in a closed position, as shown, when no other forces are applied thereto.

Figure 2:
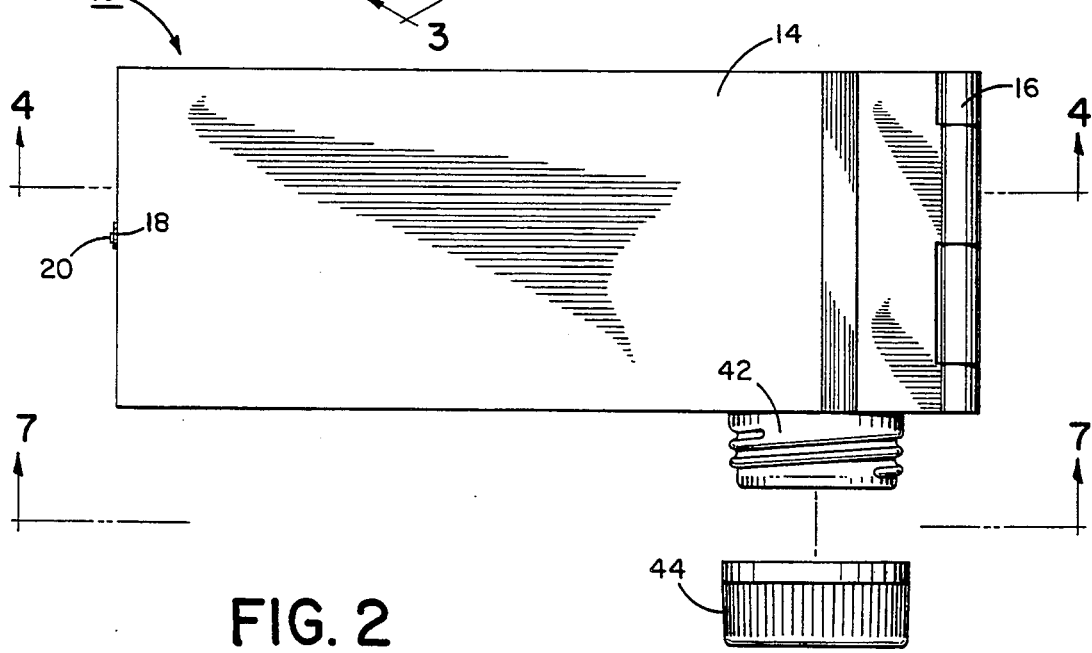
FIG. 2 is a top view of the present invention improved animal trap of FIG. 1 with the bait cap removed, taken along line 2—2 of FIG. 1.
Figure 5:
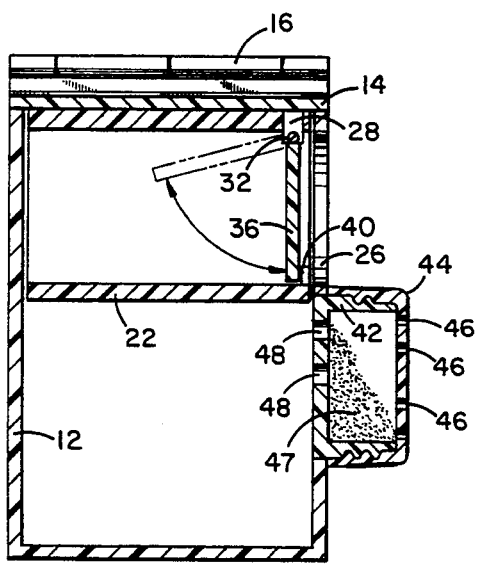
FIG. 5 is a cross-sectional view of the present invention improved animal trap of FIG. 1 with the entry door shown in its operative positions, taken along line 5—5 of FIG. 3.
Figure 6:
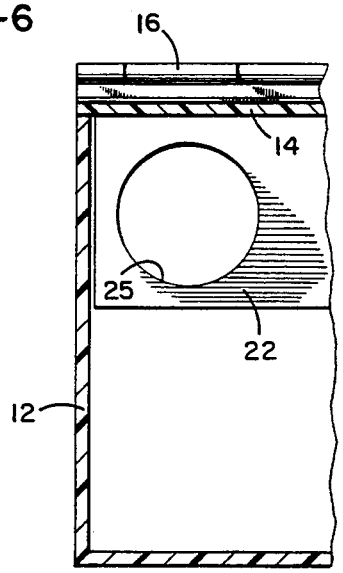
FIG. 6 is a cross-sectional view of the present invention improved animal trap of FIG. 1, taken along line 6—6 of FIG. 4.
Figure 7:
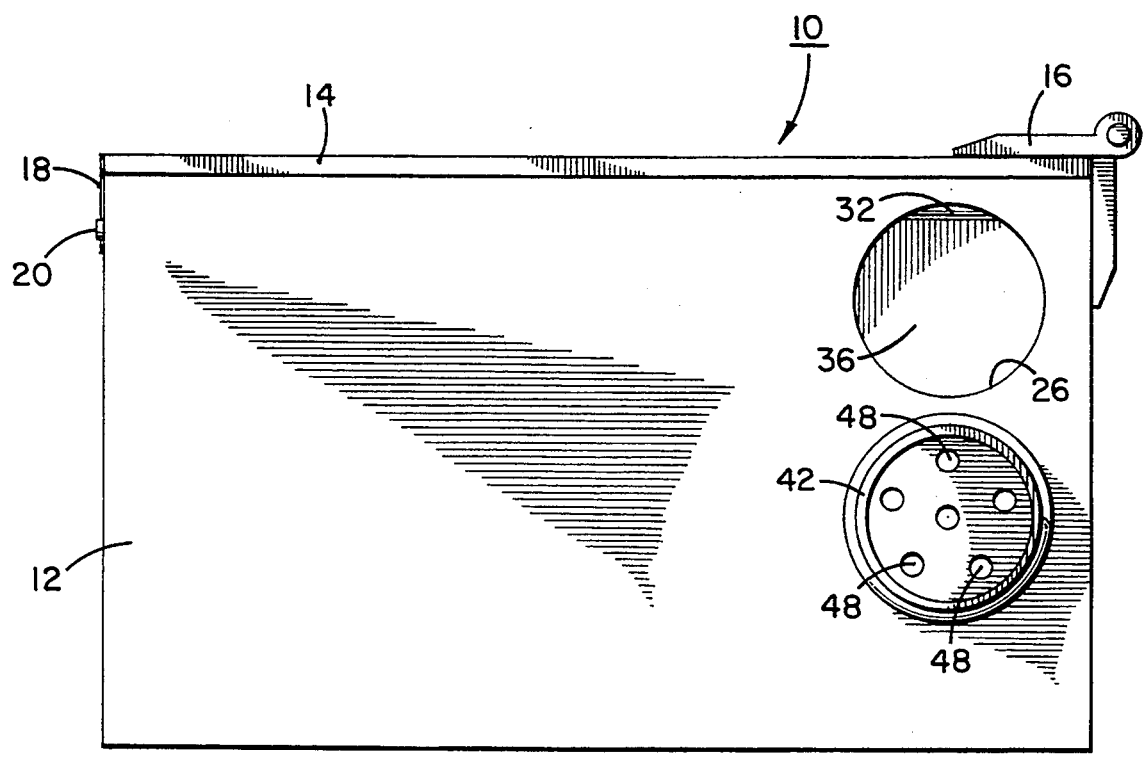
FIG. 7 is a side view of the present invention improved animal trap of FIG. 1 with the bait cap removed, taken along line 7—7 of FIG. 2.

Below the circular opening 26 in the wall of the housing 12 is a protruding cylinder 42 where bait may be stored (see FIGS. 2, 5 and 7). The exterior of this cylinder 42 is threaded so as to allow a mating cap 44 to be screwed thereon, thereby confining the bait therein. A plurality of holes 46 are punched through the top of the mating cap 44 so as to allow the aroma of the bait 47 to emanate around the outside of the trap 10, thereby initially attracting an animal to the trap 10. Similarly, a plurality of holes 48 are formed in the wall of the housing 12 so as to allow the aroma of the bait to emanate within the trap 10 (see FIGS. 5 and 7), thereby encouraging an animal to fully enter the trap 10. In both cases the holes 46 and 48 are small enough to prevent an animal's paw, such as that of a mouse, from penetrating through and grabbing the bait. This arrangement keeps the inside of the trap 10 clean and requires infrequent replenishment of the bait. It should be noted that the type of bait used can be varied depending upon the type of animal that is desired to be attracted; e.g., peanut butter to attract mice. As seen in FIGS. 1 and 2, the cap can easily be removed for replenishment of old bait without opening the trap.

At this point it should be noted that the trap 10 should be manufactured from a sturdy material that is generally impervious to an animal's clawing and gnawing, such as hard plastic or metal. It is recommended that the material used be somewhat, or somewhere, translucent so that the contents of the trap 10 can be seen without opening. The individual piece parts of the trap 10 may be molded or otherwise formed into their functional structures, and these piece parts may be secured to each other with conventional means, such as gluing, rivets, sonic welding and the like. Because of its simple design, the trap 10 may be easily cleaned by opening the lid 14, unscrewing the bait cap 44, and then cleaning everything with water. This is an important aspect of the trap 10 since captured animals tend to defecate a fair amount.

The animal trap 10 functions by attracting animals with the aroma of the bait, as previously described. Since the bait aroma emanates both around the outside and within the inside of the trap 10, and since the bait is unaccessible through the bait cap 44, an animal will follow the aroma through the opening 26 in the wall of the housing 12. By applying an inward force to the door 36 in passageway 22, the animal will open the door 36 and enter the trap 10. The animal will continue to follow the aroma through the opening 25 in passageway 22 and, by again applying an inward force, will open the door 38 in passageway 24. At this point the animal will try to access the bait through the plurality of holes 48 formed in the wall of the housing 12. Once inside the housing 12, the animal will be unable to escape through the doors 36 and 38 since they will be either generally unaccessible or essentially impossible to open, as will now be explained.

First, once the animal has passed through both doors 36 and 38 in an attempt to access the bait, there is insufficient space for the animal to work in passageway 24 so as to attempt to inwardly open door 38. Similarly, if the animal is somehow successful in opening door 38, the right angle characteristic of the single non-linear passageway does not provide ample space for the animal to work in passageway 22 so as to attempt to inwardly open door 36. Thus, the doors 36 and 38 are generally unaccessible to the animal once inside the trap 10.

Secondly, while the slotted pivot regions 28 and 30 assist in providing the doors 36 and 38 with a hinge arrangement, as previously described, they also allow the doors 36 and 38 to move upward when in their vertical, or closed, positions. And while it is unlikely that the animal will be able to acquire a grip on the doors 36 and 38, if the animal is able to grab the doors 36 and 38 they will typically move upward into the slotted pivot regions 30 and 32, respectively, thereby preventing the doors from pivoting into the open position. Thus, it is essentially impossible for the animal to open the doors 36 and 38 from inside the trap 10, thereby preventing the animal from escaping.

With the preferred embodiment of the present invention animal trap 10 now fully described it can thus be seen that the primary objective set forth above is efficiently attained and, since certain changes may be made in the above described assembly 10 without departing from the scope of the invention, it is intended that all matter contained in the above description or shown in the accompanying drawings shall be interpreted as illustrative and not in a limiting sense.

What is claimed is:

1. An improved animal trap, comprising:
   a housing having a top, a bottom, and a peripheral sidewall which in combination form an imprisoning enclosure for confining an animal therein; said housing including a bait container for confining bait therein, and wherein said bait container has a plurality of holes formed therein so as to allow bait aroma to emanate within and around said imprisoning enclosure; wherein said bait container comprises a hollow cylinder having a thread formed thereon, the hollow cylinder for the storage of the bait therein, the cylinder attached to a portion of one of the peripheral sidewalls, said portion of the peripheral sidewall having apertures therein so as to allow aroma from bait to migrate into the imprisoning enclosure, and wherein the bait enclosure further comprises a threaded cap for removable engagement with the thread on the cylinder, the cap having apertures therein so as to allow aroma from the bait to migrate about the exterior of the trap; an entry port formed in said peripheral sidewall for providing access to said imprisoning enclosure;
   a non-linear passageway disposed within said imprisoning enclosure with a first end adjoined with said entry port and a second end open to said imprisoning enclosure, said passageway having at least one slotted pivot region formed therein; and
   at least one door corresponding to said at least one slotted pivot region, each said door having a pivot rod extending along one edge for suspending said door from said corresponding slotted pivot region so as to allow said door to pivot between an open and a closed position;
   wherein said passageway with each said slotted pivot region and each said corresponding door with each said pivot rod being operatively engaged to allow each said door to open in an inward direction when an inward force is applied thereto but to substantially prevent each said door from opening in said inward direction when an upward force is applied thereto, thereby allowing an animal to enter said imprisoning enclosure but substantially preventing said animal from exiting said imprisoning enclosure.

2. An improved animal trap as defined in claim 1, wherein the apertures in said sidewall portion and in the cap are dimensioned so as to prevent insertion of an animal's paw.

3. The improved animal trap as defined in claim 2, wherein said top of said housing is operatively joined to said peripheral sidewall by a hinge for providing easy access to the interior of said imprisoning enclosure.

4. The improved animal trap as defined in claim 3, wherein said top and said peripheral sidewall are releasably secured to each other by a latch and pin arrangement.

5. The improved animal trap as defined in claim 1, wherein said top of said housing is operatively joined to said peripheral sidewall by a hinge for providing easy access to the interior of said imprisoning enclosure.

6. The improved animal trap as defined in claim 5, wherein said top and said peripheral sidewall are releasably secured to each other by a latch and pin arrangement.

7. The improved animal trap as defined in claim 1, wherein said non-linear passageway is angularly structured and dimensioned so as to limit the space therein so as to prevent an animal from opening each said door once said animal is confined within said enclosure.

8. The improved animal trap as defined in claim 1, wherein said non-linear passageway is secured to said top of said housing.

9. The improved animal trap as defined in claim 1, further comprising means disposed within said non-linear passageway for preventing each said door from pivoting in an outward direction beyond said closed position.

10. The improved animal trap as defined in claim 1, wherein each said door is gravity-lowered into said closed position.

11. The improved animal trap as defined in claim 1, wherein said operative engagement of said passageway and each said door is such that each said slotted pivot region is formed to support the pivot rod of each said corresponding door so as to allow each said door to pivot between an open and a closed position and open in an inward direction when an inward force is applied thereto, and each said slotted region is also formed to substantially restrict the pivotal movement of each said corresponding door when an upward force is applied thereto, thereby substantially preventing each said door from opening in an inward direction when an upward force is applied thereto.

12. An improved animal trap as defined in claim 11, wherein the apertures in said sidewall portion and in the cap are dimensioned so as to prevent insertion of an animal's paw.

13. The improved animal trap as defined in claim 11, wherein said pivotal movement of each said door is restricted by positioning each said door upwardly within each said corresponding slotted pivot region.

14. The improved animal trap as defined in claim 1, wherein each said slotted region is operatively engaged with each said corresponding door by supporting the pivot rod of each said door so as to allow each said door to pivot between an open and a closed position and open in an inward direction when an inward force is applied thereto.

15. The improved animal trap as defined in claim 1, wherein each said slotted region is operatively engaged with each said corresponding door by restricting the pivotal movement of each said door when an upward force is applied thereto, thereby substantially preventing each said door from opening in an inward direction when an upward force is applied thereto.

16. The improved animal trap as defined in claim 1, wherein said pivotal movement of each said door is restricted by positioning each said door upwardly within each said corresponding slotted pivot region.

17. An improved animal trap as defined in claim 16, wherein the apertures in said sidewall portion and in the cap are dimensioned so as to prevent insertion of an animal's paw.

* * * * *